US011567771B2

(12) United States Patent
Cain, III et al.

(10) Patent No.: US 11,567,771 B2
(45) Date of Patent: Jan. 31, 2023

(54) METHOD AND APPARATUS FOR BACK END GATHER/SCATTER MEMORY COALESCING

(71) Applicant: Marvell Asia Pte, Ltd., Singapore (SG)

(72) Inventors: Harold Wade Cain, III, Raleigh, NC (US); Nagesh Bangalore Lakshminarayana, San Jose, CA (US); Daniel Jonathan Ernst, West St. Paul, MN (US); Sanyam Mehta, Hopkins, MN (US)

(73) Assignees: Marvell Asia PTE, LTD., Singapore (SG); Cray Inc., Seattle, WA (US)

( * ) Notice: Subject to any disclaimer, the term of this patent is extended or adjusted under 35 U.S.C. 154(b) by 178 days.

(21) Appl. No.: 16/944,146

(22) Filed: Jul. 30, 2020

(65) Prior Publication Data
US 2022/0035633 A1 Feb. 3, 2022

(51) Int. Cl.
*G06F 9/30* (2018.01)
*G06F 9/38* (2018.01)
*G06F 9/54* (2006.01)

(52) U.S. Cl.
CPC ...... *G06F 9/30145* (2013.01); *G06F 9/30043* (2013.01); *G06F 9/30047* (2013.01); *G06F 9/3834* (2013.01); *G06F 9/546* (2013.01)

(58) Field of Classification Search
None
See application file for complete search history.

(56) References Cited

U.S. PATENT DOCUMENTS 5,671,444 A * 9/1997 Akkary ............... G06F 12/0831
710/52
5,940,611 A * 8/1999 Arimilli ............... G06F 9/30043
712/225
(Continued)

FOREIGN PATENT DOCUMENTS

| CN | 110908716 A | | 3/2020 | |
|---|---|---|---|---|
| GB | 2540405 A | * | 1/2017 | ........... G06F 9/3836 |

(Continued)

OTHER PUBLICATIONS

'Micro-Operation Cache: A Power Aware Frontend for Variable Instruction Length ISA' by Baruch Solomon et al., IEEE Transactions on Very Large Scale Integration (VLSI) Systems, Nov. 2003. (Year: 2003).*

(Continued)

*Primary Examiner* — Steven G Snyder
(74) *Attorney, Agent, or Firm* — Hamilton, Brook, Smith & Reynolds, P.C.

(57) ABSTRACT

A system for processing gather and scatter instructions can implement a front-end subsystem, a back-end subsystem, or both. The front-end subsystem includes a prediction unit configured to determine a predicted quantity of coalesced memory access operations required by an instruction. A decode unit converts the instruction into a plurality of access operations based on the predicted quantity, and transmits the plurality of access operations and an indication of the predicted quantity to an issue queue. The back-end subsystem includes a load-store unit that receives a plurality of access operations corresponding to an instruction, determines a subset of the plurality of access operations that can be coalesced, and forms a coalesced memory access operation from the subset. A queue stores multiple memory (Continued)

addresses for a given load-store entry to provide for execution of coalesced memory accesses.

22 Claims, 7 Drawing Sheets

(56) References Cited

U.S. PATENT DOCUMENTS

| | | | | |
|---|---|---|---|---|
| 5,956,503 | A * | 9/1999 | Arimilli | G06F 9/30181 |
| | | | | 712/225 |
| 8,447,911 | B2 * | 5/2013 | Burger | G06F 9/3826 |
| | | | | 711/5 |
| 8,943,273 | B1 * | 1/2015 | Jamil | G06F 9/3826 |
| | | | | 711/126 |
| 9,146,774 | B2 * | 9/2015 | Busaba | G06F 9/52 |
| 9,158,573 | B2 * | 10/2015 | Busaba | G06F 12/0815 |
| 9,280,479 | B1 * | 3/2016 | Kruckemyer | G06F 9/38 |
| 9,348,522 | B2 * | 5/2016 | Busaba | G06F 3/0617 |
| 9,348,523 | B2 * | 5/2016 | Busaba | G06F 3/0617 |
| 9,361,031 | B2 * | 6/2016 | Busaba | G06F 9/467 |
| 9,383,930 | B2 * | 7/2016 | Busaba | G06F 8/33 |
| 9,430,276 | B2 * | 8/2016 | Busaba | G06F 9/526 |
| 9,619,383 | B2 * | 4/2017 | Busaba | G06F 3/067 |
| 10,901,745 | B2 * | 1/2021 | Lichtenau | G06F 9/30098 |
| 2002/0184460 | A1 * | 12/2002 | Tremblay | G06F 9/30043 |
| | | | | 711/167 |
| 2007/0038844 | A1 * | 2/2007 | Valentine | G06F 9/3863 |
| | | | | 712/219 |
| 2009/0300338 | A1 * | 12/2009 | Caprioli | G06F 9/3834 |
| | | | | 712/228 |
| 2013/0326160 | A1 * | 12/2013 | Sperber | G06F 9/345 |
| | | | | 711/154 |
| 2014/0095831 | A1 * | 4/2014 | Grochowski | G06F 9/30145 |
| | | | | 712/205 |
| 2014/0181464 | A1 * | 6/2014 | Forsyth | G06F 9/30018 |
| | | | | 711/214 |
| 2014/0344553 | A1 | 11/2014 | Hughes et al. | |
| 2015/0074373 | A1 * | 3/2015 | Sperber | G06F 9/345 |
| | | | | 712/7 |
| 2015/0169361 | A1 * | 6/2015 | Busaba | G06F 3/067 |
| | | | | 711/147 |
| 2015/0378907 | A1 * | 12/2015 | Busaba | G06F 9/467 |
| | | | | 711/141 |
| 2016/0103785 | A1 * | 4/2016 | Sperber | G06F 9/30043 |
| | | | | 712/22 |
| 2016/0147446 | A1 | 5/2016 | Ghosh | |
| 2016/0371082 | A1 | 12/2016 | Yudanov et al. | |
| 2017/0123794 | A1 * | 5/2017 | Chen | G06F 9/3012 |
| 2017/0123795 | A1 * | 5/2017 | Chen | G06F 9/30127 |
| 2017/0177543 | A1 | 6/2017 | Jha et al. | |
| 2017/0315919 | A1 * | 11/2017 | Guthrie | G06F 12/0893 |
| 2017/0315922 | A1 * | 11/2017 | Guthrie | G06F 9/3004 |
| 2018/0095761 | A1 | 4/2018 | Winkel et al. | |
| 2019/0163475 | A1 | 5/2019 | King et al. | |
| 2020/0065109 | A1 * | 2/2020 | Shen | G06F 9/384 |
| 2020/0097291 | A1 * | 3/2020 | Hughes | G06F 9/30109 |
| 2020/0097298 | A1 * | 3/2020 | Hughes | G06F 9/30036 |
| 2021/0026627 | A1 * | 1/2021 | Abhishek Raja | G06F 9/30101 |
| 2021/0064533 | A1 * | 3/2021 | Schinzler | G06F 9/30156 |

FOREIGN PATENT DOCUMENTS

| | | | | |
|---|---|---|---|---|
| GB | 2540940 | A * | 2/2017 | G06F 15/8061 |
| GB | 3812891 | A1 * | 4/2021 | |

OTHER PUBLICATIONS

Non-Final Office Action for U.S. Appl. No. 16/944,141, consisting of 9 pages. Dated: Aug. 18, 2021.

"Notification of Transmittal of the International Search Report and the Written Opinion of the International Searching Authority, or the Declaration," issued for International Application No. PCT/US2021/043476, entitled "Method and Apparatus for Front End Gather/Scatter Memory Coalescing," dated Dec. 2, 2021.

"Notification of Transmittal of the International Search Report and the Written Opinion of the International Searching Authority, or the Declaration," issued for International Application No. PCT/US2021/043500, entitled "Method and Apparatus for Back End Gather/Scatter Memory Coalescing," dated Dec. 2, 2021.

* cited by examiner

| TID 205 | TAG 210 | μOP COUNT 215 | USE COUNT 220 | PREDICTION THRESHOLD 225 |
|---|---|---|---|---|
| [2 bits] | [62 bits] | [5 bits] | [3 bits] | [3 bits] |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

METHOD AND APPARATUS FOR BACK END GATHER/SCATTER MEMORY COALESCING

GOVERNMENT SUPPORT

This invention was made with government support under Government Contract No. AC52-07NA27344 and subcontract B620872 from the United States Department of Energy. The government has certain rights in the invention.

BACKGROUND

Gather and scatter instructions are types of vector load/store instructions that access multiple memory locations. Gather instructions perform loads, and scatter instructions perform stores. Gather/scatter memory operations, also referred to as indexed memory accesses, appear commonly in modern scientific and data analysis applications that often involve sparse and adaptive data abstractions, such as adaptive meshes, sparse matrices, tensors, and graphs. For any given application context, a gather/scatter operation may involve indirection offsets that are highly random or regular. These applications may exhibit patterns with or without locality, and sequences of such operations may be highly serialized or highly parallel.

Historically, gather/scatter instructions have been supported in the context of vector supercomputers, but until very recently have not been supported by general purpose instruction set architectures. Recently, support for these instructions have appeared in general purpose instruction sets, such as x86 and ARM.

SUMMARY

Example embodiments include a system for processing gather and scatter instructions. The system may implement a front-end subsystem and/or a back-end subsystem. The front-end subsystem may include a prediction unit configured to determine a predicted quantity of coalesced memory access operations required by an instruction, the instruction being a scatter instruction or a gather instruction. A decode unit may be configured to 1) convert the instruction into a plurality of access operations based on the predicted quantity, and 2) transmit the plurality of access operations and an indication of the predicted quantity to an issue queue.

The system may further comprising a load-store unit configured to 1) determine an actual quantity of coalesced memory accesses required by the instruction, and 2) provide an indication of the actual quantity to the prediction unit. The prediction unit may update a table based on the predicted quantity and the actual quantity. The prediction unit may update an entry of the table, the entry corresponding to the instruction and including fields indicating the predicted quantity and a confidence score indicating an estimated accuracy of the predicted quantity. The prediction unit may update at least one of the predicted quantity and the confidence score based on the actual quantity.

The load-store unit may also determine a subset of the plurality of access operations that can be coalesced, and form a coalesced memory access operation from the subset. The load-store unit may analyze a portion of the plurality of access operations to determine the subset of the plurality of access operations that can be coalesced. The load-store unit may further 1) assign the coalesced memory access operation to at least one register entry, and 2) execute the coalesced memory access operation via a load-store pipeline. The load-store unit may further determine a misprediction of the prediction unit based on a comparison of the predicted quantity and the actual quantity.

The plurality of access operations may have a quantity equal to the predicted quantity. The prediction unit may be further configured to determine the predicted quantity by locating an entry of a table based on a program counter of the instruction, the predicted quantity corresponding to a field of the entry. The prediction unit may be further configured to update the field based on an indication of a misprediction, and may refrain from updating the table if the predicted quantity exceeds an actual quantity of coalesced memory accesses required by the instruction. The decode unit, in response to a misprediction, may be configured to re-transmit the plurality of access operations with an indication of an actual quantity of coalesced memory accesses required by the instruction.

In further embodiments, the back-end subsystem may include a load-store unit and a queue such as a load reorder queue (LRQ) and/or a store reorder queue (SRQ). The load-store unit may be configured to 1) receive a plurality of access operations corresponding to an instruction, the instruction being one of a scatter instruction and a gather instruction, 2) determine a subset of the plurality of access operations that can be coalesced, and 3) form a coalesced memory access operation from the subset. The queue may be configured to store multiple memory addresses for a given load-store entry, wherein the load-store unit may be configured to load an entry corresponding to the coalesced memory access operation to the queue, the entry indicating addresses of each of the subset.

The load-store unit may be further configured to determine a minimum quantity of cache accesses required for the instruction based on the plurality of access operations, and may reserve a number of operational cycles corresponding to the minimum number of cache accesses. The load-store unit may further execute the coalesced memory access operation via a memory access lane over the number of operational cycles.

The sub-system may further comprise a decode unit configured to 1) convert the instruction into the plurality of access operations, and 2) transmit the plurality of access operations to the load-store unit. The decode unit may also transmit to the load-store unit an indication of a predicted quantity of coalesced memory access operations required by the instruction, and the load-store unit may determine an actual quantity of coalesced memory accesses required by the instruction, and provide an indication of the actual quantity to a prediction unit. The prediction unit may also update a table based on the predicted quantity and the actual quantity. The load-store unit may determine a misprediction based on a comparison of the predicted quantity and the actual quantity of coalesced memory access operations required by the instruction.

The load-store unit may also analyze a portion of the plurality of access operations to determine the subset of the plurality of access operations that can be coalesced. The load-store unit may be further configured to assign the coalesced memory access operation to at least one memory access lane, and execute the coalesced memory access operation via the memory access lane.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Gather/scatter instructions are vector load/store instructions that access multiple memory locations. Gather instructions perform loads, and scatter instructions perform stores. Historically, gather/scatter instructions have been supported in the context of vector supercomputers, but until very recently have not been supported by general purpose instruction set architectures. Recently, support for these instructions have appeared in general purpose instruction sets, such as x86 and ARM.

Supporting an instruction that accesses multiple disjoint (non-contiguous) memory locations represents a new challenge for modern general-purpose core microarchitectures. Such microarchitectures are typically comprised of one or more load/store units, wherein each unit is capable of reading or writing from/to a single address per cycle. Modifying such pipelines to support access to multiple memory locations can be prohibitively expensive.

One implementation of gather/scatter instructions in general-purpose core microarchitectures involves decoding a single gather/scatter instruction into a sequence of micro-operations (μops), each of which is responsible for performing the load or store of a single memory location. Such an implementation is simple in terms of hardware costs, yet may offer little performance benefit compared to conventional (non-gather/scatter) load/store instructions. For workloads that have significant use of gather or scatter instructions, this style of implementation can lead to significant bottlenecks from processing an increased number of μops.

Example embodiments described herein provide microarchitectural support for optimizing the performance of gather/scatter instructions in CPU cores. These optimizations include a speculative prediction based mechanism that allows μops to be fused in the core's front-end pipeline, as well as enhancements to structures in the core's back end pipeline, focused on the load reorder queue, store reorder queue, reorder buffer, and scheduler. In one example, multiple μops from a gather/scatter instruction may be fused into a smaller number of macro μops, and each resulting fused macro μop corresponds to one or more of the original sequence of μops. The rules for determining the set of μops that are fused together may be based on the addresses touched by those μops (e.g. whether the set of μops are contiguous, or whether they reference a single cache line).

In an example embodiment, fusion approaches to gather/scatter operations may leverage a combination of enhancements to a front-end pipeline and a back-end pipeline. A speculative, prediction-based solution allows μops to be fused in a core's front-end pipeline, and other enhancements can widen structures in the core's back end pipeline, including the load reorder queue, store reorder queue, reorder buffer, and scheduler. Both fusion in the front-end and back-end can offer substantial performance gains.

Fusion in the front-end may utilize a history-based coalescing predictor to determine the number of fused μops (also referred to as a macro μop or coalesced μop) that should be passed to the back end of the core. In one example embodiment as tested, a 512-entry table using the maximum of recently observed gather/scatter instances may achieve near 100% accuracy and substantial coverage. A further embodiment implementing coalesced μops in the back-end structures also showed performance gains. In combination, the gains from back-end and front-end fusion may be additive in many embodiments. There are also applications that may benefit more from either the front-end approach or the back-end approach.

Figure 1:
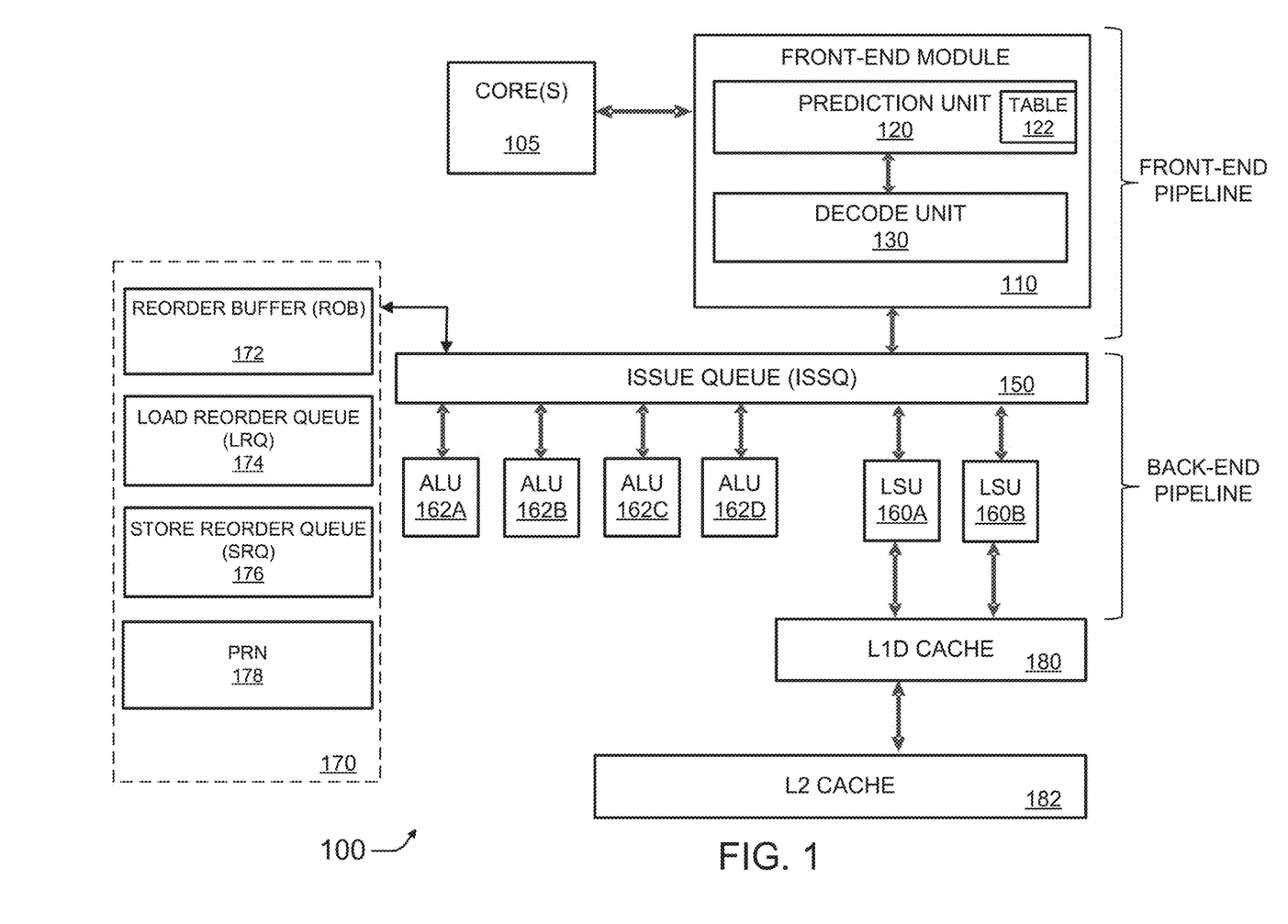
FIG. 1 is a block diagram of a memory access system in which example embodiments may be implemented.

FIG. 1 is a block diagram of a memory access system 100 in which example embodiments may be implemented. A front-end module 110 communicates with one or more processor cores 105 issuing memory access requests such as scatter and gather instructions. The front-end module 110 may fetch those requests from the cores 105 and, upon completion of each request, provide a confirmation or requested data to the cores 105. The front-end module 110 may include components making up a front-end pipeline, including a prediction unit 120 and a decode unit 130 described in further detail below. For a given gather/scatter instruction, the front-end module 110 may generate a number of μops that are forwarded to an issue queue 150, which assigns the μops to one or more load/store units 160A-B. The load/store units 160A-B, in turn, may perform load or store operations in accordance with the assigned μops. In doing so, the load/store units 160A-B may access one or more of an L1 data cache 180, an L2 cache 182, and other memory devices (e.g., an L3 cache or DRAM, not shown) to load and/or store data to/from those devices. The load-store units 160A-B may then return a confirmation and/or the requested data to the front-end module 110, which in turn provides the confirmation and/or requested data to the cores 105.

The issue queue 150 and load/store units (LSUs) 160A-B may be components of a back-end pipeline. To enable out-of-order processing of access requests, the back-end pipeline may further include out-of-order resources 170. The resources may include a reorder buffer (ROB) 172 configured to maintain and retire μops in order, and may maintain an ordered list of access requests. A load reorder queue (LRQ) 174 and store reorder queue (SRQ) each maintain a queue of pending load and store requests, respectively. The back-end pipeline may further include physical register files PRN 178 for general purpose registers, floating-point registers, and/or predicate registers. Each general purpose and/or floating point register file entry may be segmented into lanes, which are written by gather instructions and read by scatter instructions. The predicate register files PRN 178 may store predicate register file entries having one bit per lane. These bits may govern whether an operation on a particular lane is carried out by a gather or scatter instruction. Arithmetic-logic units (ALUs) 162A-D (and, optionally, FPU or SIMD units) may perform various operations on the subject data of a memory access, and/or may perform processing for the out-of-order resources 170 or the LSUs 160.

The system 100 may implement one or more features described herein to optimize processing of gather/scatter instructions issued by the cores 105. These features include features implemented at the front-end pipeline as well as features implemented in the back-end pipeline, and those features can be embodied independently or in combination with one another.

At the front-end pipeline, the front-end module 110 may implement a prediction unit 120 that enables the module 110 to coalesce multiple memory accesses prior to sending to the back-end pipeline. Based on a previous history maintained at a history table 122, the prediction unit 120 may predict the number of coalesced accesses that will be made by a given gather/scatter instruction, and based on this prediction, the decode unit 120 may decode the gather/scatter instruction and create as many μops as predicted, rather than creating one μop for each lane (e.g., vector register lane or scalable vector extension (SVE) lane). The μops created for a gather/scatter instruction for which the prediction unit 120 returns a prediction may be referred to as coalesced μops (or coalesced memory access operations).

With no coalescing, each gather/scatter μop would be responsible for only one lane. In contrast, each coalesced gather/scatter μop (gather/scatter μop created using predictions from the prediction unit 120) may be responsible for more than one lane. The coalesced μops may have wider accesses to ensure that all bytes that are supposed to be accessed by the gather/scatter instruction will still be accessed even with fewer μops created. Because the memory locations accessed by a gather/scatter instruction will not be known until instruction execution, the memory locations accessed by the coalesced μops may not be determined until later in the pipeline, such as when the coalesced μops are executed at the back-end pipeline. The history table 122 maintained by the prediction unit 120 may include entries that are tagged with bits from the program counter (PC) of gather/scatter instructions for tracking the history of each gather/scatter instruction and making predictions. PC bits may be used for indexing the history table 122 as well.

Figure 2:
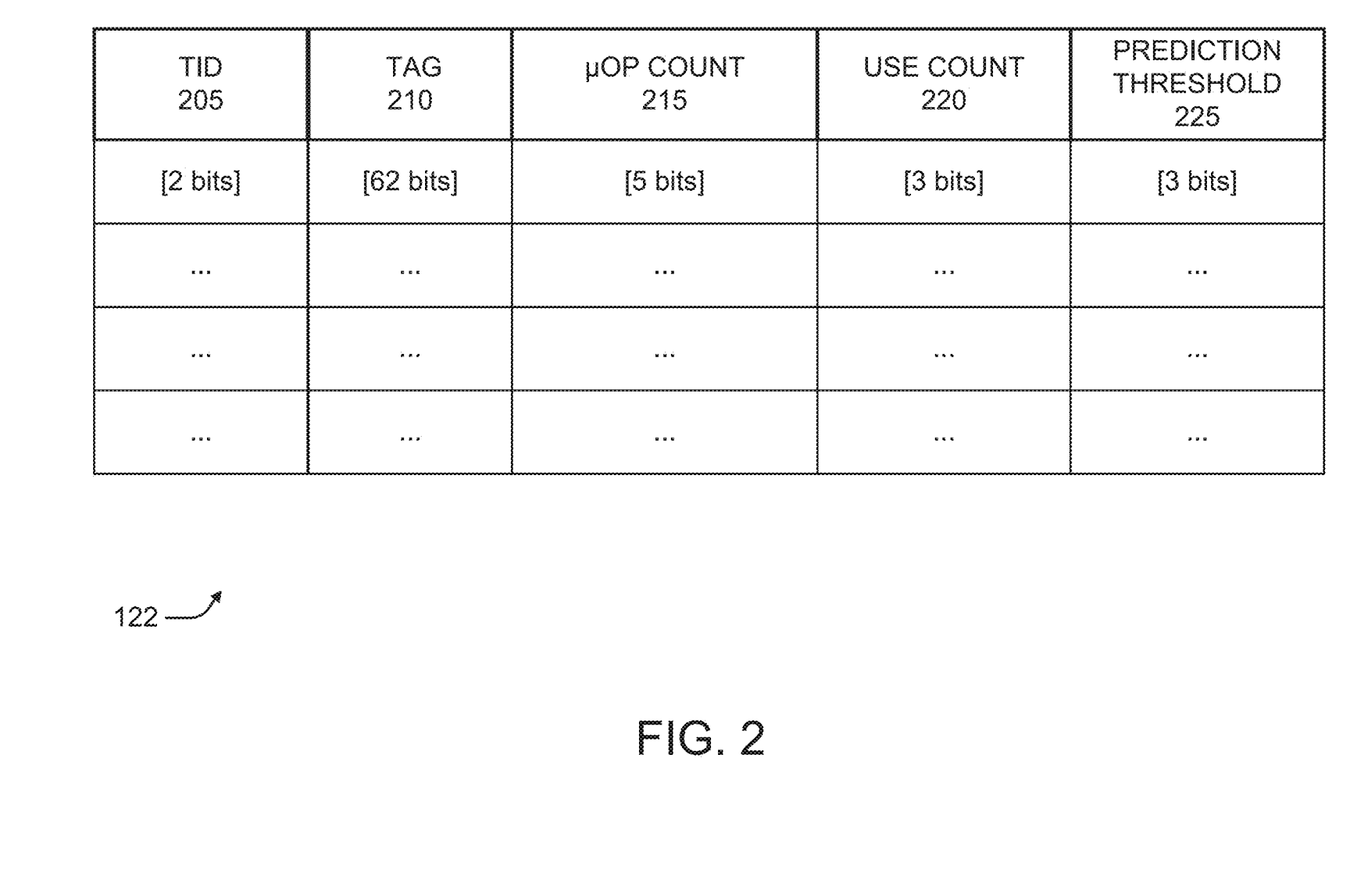
FIG. 2 is a block diagram of a history table in one embodiment.

FIG. 2 illustrates the history table 122 in further detail. The history table 122 may store a number of entries corresponding to gather/scatter instructions that were previously processed by the backend pipeline (e.g., LSU), and each entry of the table may comprise a number of fields, including one or more of a transaction identifier (TID) field 205, a tag field 210, a μop count field 215, a use count field 220, and a prediction threshold field 225. The TID field 205 (e.g., 2 bits) may contain the thread identifier of the thread that owns the entry. The tag field 205 (e.g., 62 bits) may comprise multiple PC bits and may be used to distinguish history information of one PC from another. The μop count field 215 (e.g., 5 bits) may indicate a predicted number of accesses the gather/scatter instruction would need if the memory accesses to the same cache line were coalesced; thus, it indicates the number of coalesced μops needed by the instruction. The use count field 220 (e.g., 3 bits) may be a saturating counter that measures the number of times the entry has been accessed/updated, and can be used as an indicator of the confidence in the value in the μop count field 215. The prediction unit 120 can be configured to make a prediction using an entry when the use count of that entry is above the configured prediction threshold. When a PC does not have an entry in the history table 122 or if the use count for the PC in the table is not above the prediction threshold, the decode unit 130 may create as many μops as the number of lanes (e.g., SVE lane) for the gather/scatter instruction. The history table 122 may comprise multiple rows with multiple entries in each row. Having multiple entries in a row may reduce conflicts due to multiple PCs mapping to the same table row.

Although each field of the history table 122 is shown having an example bit length, in further embodiments, the fields may have different or variable lengths.

Figure 3:
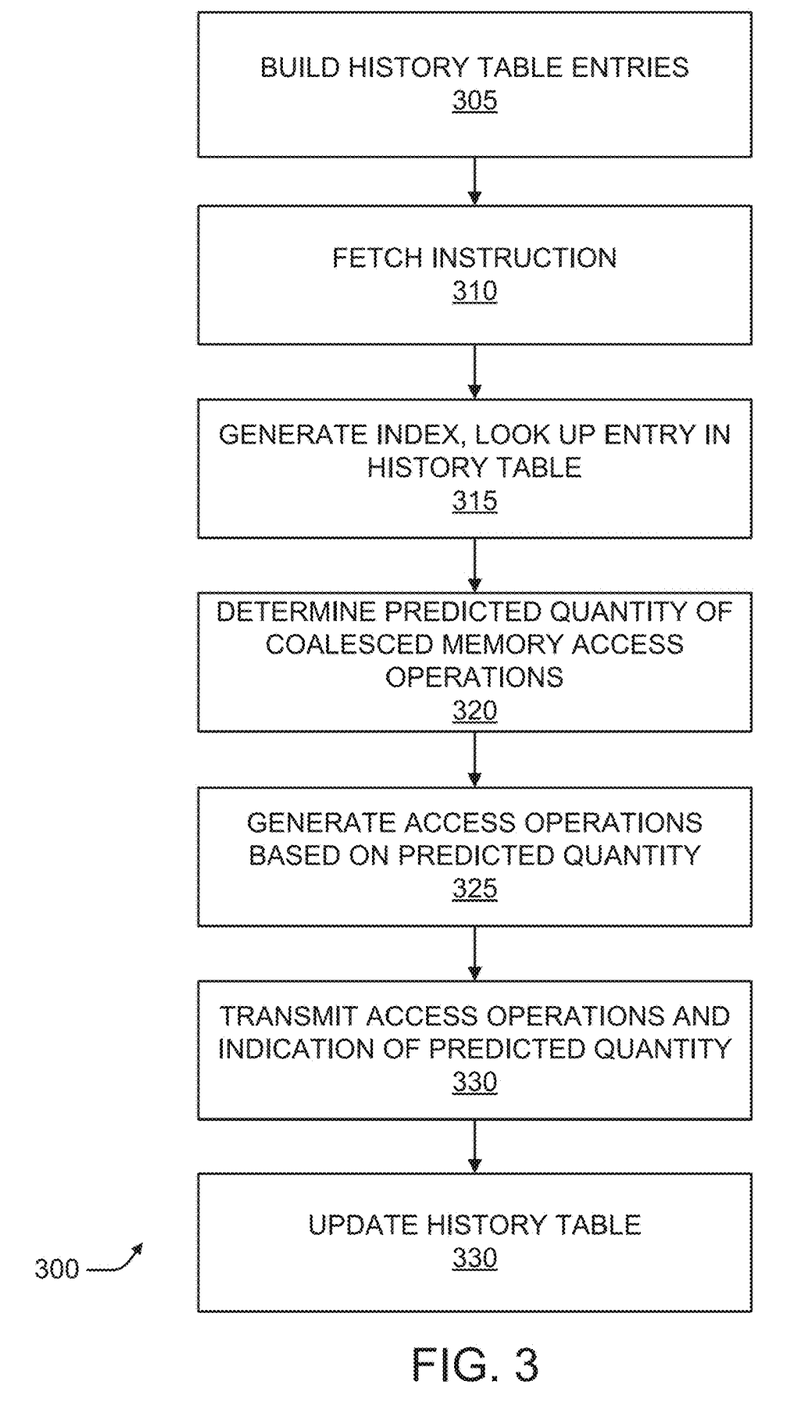
FIG. 3 is a flow diagram illustrating a process of generating a history table and making a prediction in one embodiment.

FIG. 3 is a flow diagram illustrating a process 300 of building a history at the history table 122 and making predictions via the prediction unit 120 in one embodiment. With reference to FIGS. 1 and 2, upon initialization or reset of the system 100, the history table 122 may contain no entries. The history table 122 may also be periodically cleared (partially or fully) during operation to remove outdated or unused entries. Entries of the history table 122 may be built as follows (305). When a gather/scatter instruction retires, a component of the back-end pipeline (e.g., the LSUs 160A-B) may determine the number of coalesced accesses/μops required by the instruction. Then, the LSUs 160A-B (or other element) may send a tuple containing the thread ID, PC, and the number of coalesced μops required by the instruction to the prediction unit 120. On receiving the tuple, the prediction unit 120 may fold over the non-zero PC bits (i.e., bits other than bit-0 and bit-1) once, and may perform an exclusive-OR (XOR) operation with the folded bits and the rest of the non-zero bits to generate an index to access the history table 122. Alternatively, other indexing processes may be implemented. The number of bits folded over may be equal to the index width (e.g., log 2) (predictor table length). The history table 122 may be accessed and, if a matching entry is found (e.g., the TID 203 and μop count 215 are in the tuple, the tag computed from the tuple matches the TID 205, and the μop count and tag 210 are in a table entry), the use count field 220 of the entry may be incremented. If the TID 205 and tag 210 match, but the μop count 220 does not match, the use count 220 may be decremented by two. If there is no TID 205 and tag 210 match and a free entry is available (e.g., entry use count is 0), a new entry may be initialized with the data from the tuple, and the use count 220 of the new entry may be set to one. In case there is no TID 205 and tag 210 match and no free entries are available, the use count of all entries in the row may be decremented by one. Alternatively, other replacement policies may be implemented.

When the history table 122 is updated to include an entry relevant to a newly-received gather/scatter instruction, the prediction unit 120 may make a prediction for the instruction as follows. When the gather/scatter instruction is fetched (310), the prediction unit 120 may look up the history table 122 with an index generated from the PC of the gather/scatter instruction using a computation comparable to that described above for generating an entry to the history table (e.g., an XOR computation) (315). If a matching entry is found and the use count 220 of the entry is above the prediction threshold 225, the prediction unit 120 may predict that all accesses of the gather/scatter instruction can be completed with a reduced number of μops. The prediction unit 120 may determine a predicted quantity of coalesced memory access operations (e.g., coalesced μops) based on the μop count field 215 of the matching entry, and may then pass this predicted quantity to the decoder 130 (320). Then, when decoding the instruction, the decoder 130 may generate a number of access operations (μops) based on the predicted quantity (325). For example, the decoder 130 may generate a number of access operations equal to the predicted quantity. Alternatively, to increase the likelihood of an accurate prediction, the decoder 130 may generate a number of μops that is greater than the predicted quantity. A similar result can be achieved by building a tolerance into the μop count field 215 of the history table 122.

The decoder unit 130 may then transmit the access operations and an indication of the predicted quantity to the issue queue 150 for execution by the back-end pipeline (e.g., LSUs 160A-B) (330). The issue queue 150 may assign the access operations to one or more of the LSUs 160A-B, which perform the access operations accordingly (e.g., load/store from/to the L1D cache 180, L2 cache 182 and/or other cache/memory units). Operation of the LSUs 160A-B is described in further detail below. The LSUs 160A-B may further provide feedback indicating the accuracy of the predicted quantity, wherein the feedback may indicate an actual quantity of coalesced access operations required by the instruction, a confirmation that the prediction was accurate, or an indication that the prediction was incorrect (e.g., the instruction required a greater number of coalesced access operations than predicted). In response to this feedback, the prediction unit 120 may update the history table 122 accordingly (330). For example, following an accurate prediction, the prediction unit 120 may increment the use count 220 of the corresponding entry. Following an inaccurate prediction, the prediction unit may update the μop count 220 of the entry to match or exceed the actual quantity of coalesced access operations reported by the LSUs 160A-B. Following an inaccurate prediction, the front-end module 110 may also perform a pipeline flush and repeat the operations 310-330, wherein the decoder 130 may transmit a number of access operations corresponding to the actual quantity of coalesced access operations.

Figure 4:
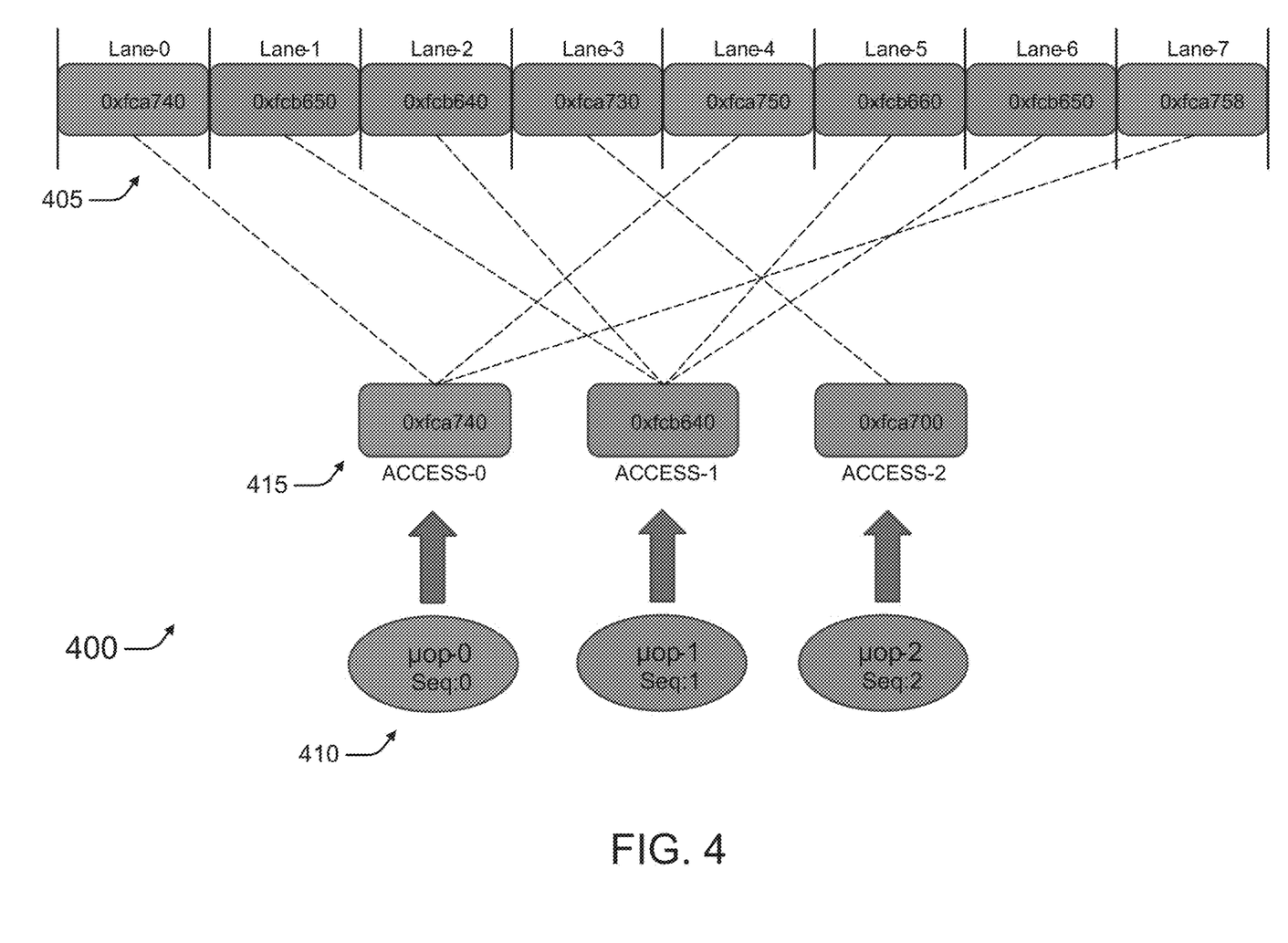
FIG. 4 is a diagram illustrating prediction and access operations in one embodiment.

FIG. 4 illustrates a process 400 including a prediction and an access operation in one embodiment. In this example, a gather/scatter instruction may comprise 8 access operations (μops) 405, wherein each μop may occupy a separate lane as shown by lanes 0-7. Each of the access operations 405 is represented in FIG. 4 by a starting address in a memory to be accessed by the operation. Following a prediction by the prediction unit 120 of three coalesced memory access operations required by the instruction, the decoder unit 130 may transmit the access operations and an indication of the predicted quantity to the issue queue 150. As a result of the predicted quantity, the instruction is allotted three coalesced memory access operations (coalesced μops) 410. One or more of the LSUs 160A-B may then determine which of the access operations 405 can be coalesced based on the target addresses and/or other properties as described in further detail below. Based on this determination, the LSUs 160A-B may then coalesce the access operations 405 into three coalesced memory accesses 415. The three coalesced memory accesses 415 are represented in FIG. 2 by a starting address for a sequence of memory accesses that encompass all of the memory accesses being coalesced. For example, the coalesced memory accesses access-0 is represented by the address 0xfca740, which corresponds to the first of three neighboring addresses to be accessed by the three access operations making up access-0. Once coalesced, the LSUs 160A-B may assign each coalesced memory access 415 to an available coalesced memory access operation 410, and then execute each coalesced memory access operation accordingly.

Figure 5:
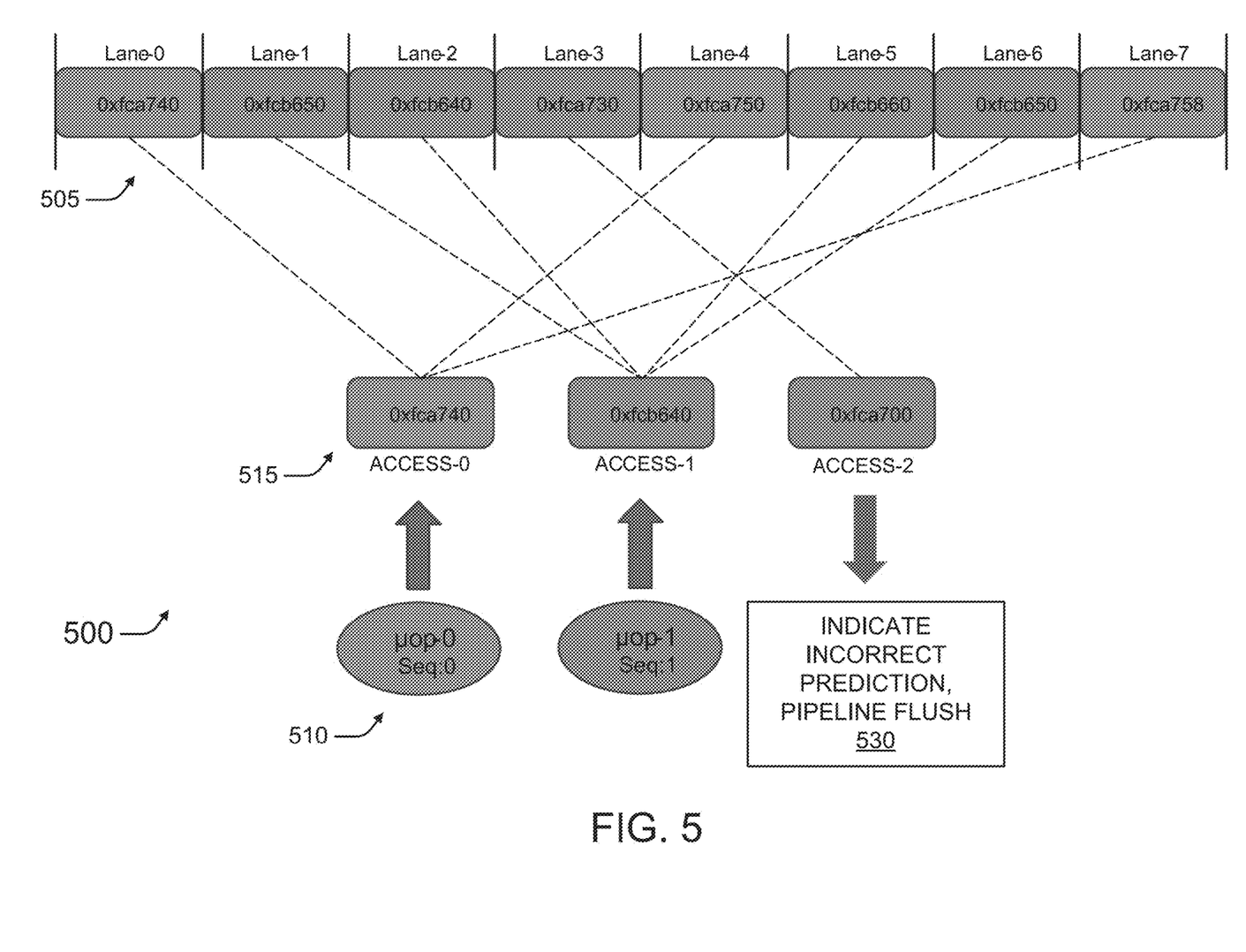
FIG. 5 is a diagram illustrating prediction and access operations when an incorrect prediction is made.

FIG. 5 illustrates a process 500 including a prediction and an access operation when a predicted quantity of coalesced memory access operations is less than the number required by a given instruction. In this example, the process 500 is comparable to the process 400 of FIG. 4, with the exception that the prediction unit 120 predicts two coalesced memory access operations 510, yet the instruction still requires three for the access operations 505, as indicated by the three coalesced memory accesses 515. As a result, if two of the memory accesses 515 are assigned to respective access operations 510, a third memory access ("access-2") cannot be assigned, and thus cannot be executed by an LSU 160A-B. In response, the LSU 160A-B or another component may issue an indication of an incorrect prediction, and issue a pipeline flush (530). The indication (or other notification regarding the number of required coalesced memory access operations) may also be transmitted to the prediction unit 120 to update the history table 122 as described above. Following the pipeline flush, the process 500 may be repeated, as described above with reference to FIGS. 3 and 4, using a number of access operations matching the required number of coalesced memory accesses.

Figure 6:
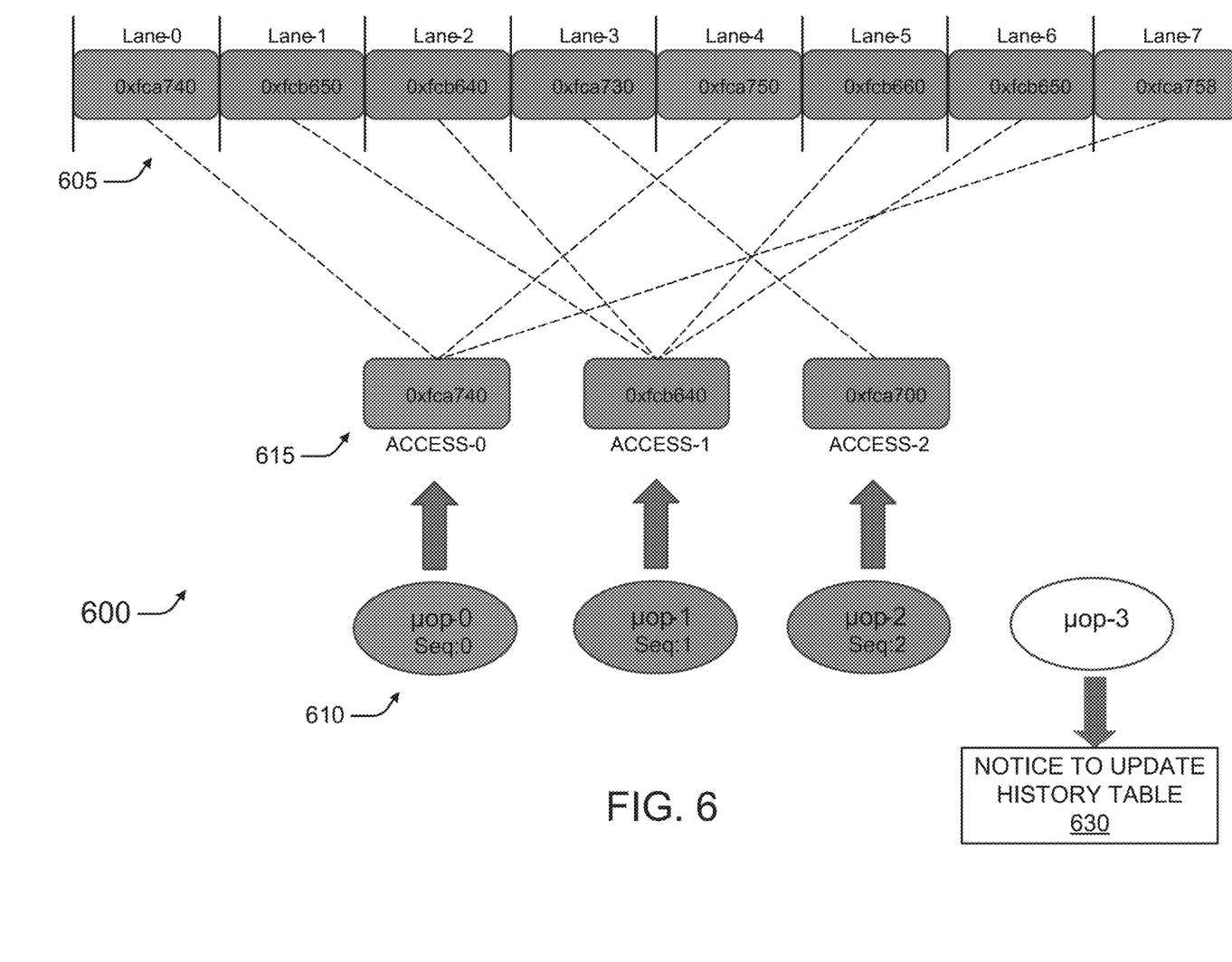
FIG. 6 is a diagram illustrating prediction and access operations in a further embodiment.

FIG. 6 illustrates a process 600 including a prediction and an access operation when a predicted quantity of coalesced memory access operations exceeds the number required by a given instruction. In this example, the process 600 is comparable to the process 400 of FIG. 4, with the exception that the prediction unit 120 predicts four coalesced memory access operations 610, yet the instruction still requires three for the access operations 605, as indicated by the three coalesced memory accesses 615. As a result, after all three of the memory accesses 615 are assigned to respective access operations 610, a fourth memory access (access-3) is left unassigned and may be regarded as a "no-op." However, in contrast to the process 500 of FIG. 5, a pipeline flush is unnecessary, as each of the coalesced memory accesses 615 can be executed by an assigned memory access operation 610. Even so, the LSU 160A-B or other component may issue a notification to the prediction unit 120 to update the history table 122 (630), thereby improving the accuracy of future predictions using the corresponding table entry.

Returning to FIG. 1, various aspects of the system 100, and the LSUs 160A-B in particular, may be configured with a number of features to operate with the front-end module 110 and execute coalesced access operations. An example of such features and configurations are described below. Turning first to the decoder 130, each coalesced μop that is generated by the decoder 130 may be assigned a sequence number that ranges from 0 to n−1, wherein n is the number of μops generated for the gather/scatter instruction, when a gather/scatter instruction is decoded in the front-end using the prediction from the prediction unit 120.

Turning to the LSUs 160A-B, after a coalesced memory access is issued to the LSU 160A-B, a load/store μop may undergo register read (REG) and address generation (AGEN) stages before performing lookups in a translation lookaside buffer (TLB) and accessing the data cache. In the REG stage, the LSU 160A-B may read source registers. In the case of a gather/scatter μop, the source registers could be general purpose registers, vector registers, and predicate registers. Without coalescing, each gather/scatter μop only needs information corresponding to its lane. However, a coalesced gather/scatter μop may be configured to read all input registers fully because it may be accessing memory for multiple lanes of the gather/scatter instruction.

In the AGEN stage of a coalesced μop, the LSU 160A-B may generate addresses for all active lanes and then determines the number of coalesced accesses as well as their addresses and widths. The access width may be set so that all accesses that map to a cache line are covered. A list of coalesced addresses may be ordered using given criteria, enabling the system 100, when computing the addresses, to access the coalesced addresses in the same order as all other coalesced μops, and only one coalesced μop with be responsible for a coalesced access. From the list of coalesced addresses, a coalesced μop may be responsible for the address at the same index as its sequence number. The address that a coalesced μop will access may be known at the end of the AGEN stage so that the LSU 160A-B can look up the TLB in the next cycle. Determination of other information, such as bytes enabled for the accesses and the data offsets for the individual lanes, can be delayed until they are needed further down the pipeline. When a coalesced μop has a cache hit, the data offsets for the individual lanes may be used to return the correct bytes for each lane. To return correct data when a coalesced μop has a cache miss, miss status holding registers (MSHRs) can be augmented to hold the data offsets for the individual lanes.

When the number of coalesced μops created for a gather/scatter instruction is fewer than the number of coalesced accesses required by the instruction, such as in the process 500 described above, a misprediction has occurred because memory accesses for some of the active lanes in the gather/scatter instruction will not be completed. In the case of a misprediction, the pipeline may be flushed, and instructions may be re-fetched starting from the gather/scatter instruction for which the number of coalesced accesses was predicted incorrectly. After a flush, the prediction unit 120 may refrain from performing a prediction to avoid reoccurrence of the flush condition. To handle the flush, various mechanisms for flushing on memory ordering violations, as known in the art, may be used used. To detect mispredictions, the active lanes for a gather/scatter instruction and the active lanes for which memory will be accessed by the coalesced μops may be tracked by the LSUs 160A-B or another component. When a coalesced μpop reaches the AGEN stage at an LSU 160A-B along with the address that it accesses, the LSU 160A-B may also determine the lanes for which it will access the memory and may then update a table that tracks the masks of lanes that will be processed for each gather/scatter instruction. The table may be stored at an entry of the reorder buffer 172 associated with the instruction. The reorder buffer 172 may be configured to verifying that the number of lanes read/written matches the number of lanes expected to be read/written. Alternatively, the table may reside in the ISSQ 150, LRQ 174, and/or SRQ 176. When a coalesced μop is the last μop to reach the AGEN stage, the LSU 160A-B may compare the mask of processed lanes with the mask of active lanes. When the two are not equal, it may determine that a misprediction has occurred, and the pipeline may then be flushed.

When the number of coalesced μops created for a gather/scatter instruction is more than the number of coalesced accesses required by the instruction, such as in the process 600 described above, accesses for all the active lanes can be completed and, thus, over-predicting the number of coalesced accesses may not be considered an incorrect prediction. However, because more μops than needed were created, it may be beneficial to ensure that no incorrect architectural changes are made in the system 100. When a coalesced μop reaches the AGEN stage, the LSU 160A-B may determine the number of coalesced accesses for the instruction, and if its sequence number is greater than or equal to the number of coalesced accesses, then the μop may be treated as a "no operation" (nop) and may be marked as completed.

Turning to the prediction unit 120, the unit 120 may experience lower accuracy when the μop count for a static gather/scatter instruction is not stable. To improve the prediction unit's 120 performance in such situations, the prediction unit may be configured to track the maximum number of coalesced accesses observed rather than track the exact number of coalesced accesses observed. In such a configuration, for a given entry of the history table 122, the use count 220 may be incremented on every update to the history table 122, and predictions may be made when the use count 220 is above the prediction threshold. A predictor configuration that track the maximum number of coalesced accesses may be referred to as a "maximum" configuration, while a predictor configuration that track the exact number of coalesced accesses may be referred to as "base" configurations. In a maximum configuration, when making predictions for a gather/scatter instruction, a prediction unit 120 may predict a quantity corresponding to the maximum number of coalesced accesses the gather/scatter instruction required in the past, and often this quantity is more than the number of coalesced accesses the instruction needs. The extra assigned μops may consume pipeline resources, such as entries of the reorder buffer 172, the load reorder queue 174, and store reorder queue 176. However, this configuration may also benefit from a reduced number of incorrect predictions and the pipeline flushes required after those incorrect predictions.

As described above, example embodiments can improve a memory access system 100 by reducing the number of gather/scatter μops. In addition to the aforementioned features, the back-end pipeline of the system 100 can also be configured to provide improved performance in processing gather/scatter instructions. For example, rather than decode the gather/scatter instruction into a sequence of μops (e.g. one per lane), a single μop can be decoded and delivered to the back end of the system 100 (e.g., LSUs 160A-B), which can be configured to handle gather/scatter instructions natively. In such a configuration, some or all of the out-of-order resources 170 may be configured with fields supporting each lane of the gather/scatter instruction. In particular, with reference to FIG. 1, the LRQ 174 and SRQ 176 may be configured to have one or more fields for each entry that store multiple memory addresses for a given load-store entry, thereby enabling each entry of the LRQ 174 and SRQ 176 to track an address for each gather/scatter lane. The LSUs 160A-B may be configured such that the respective load-store pipelines are extended to accept the full-width gather/scatter instruction, and during address generation, a required number of cache accesses may be determined. In subsequent cycles, this gather/scatter instruction may cause the LSUs 160A-B to block dispatch to the load/store pipe by other instructions, enabling the instruction to be re-inserted internally to the load/store pipeline for multiple cycles (e.g., one cycle per required data TLB/cache lookup).

Figure 7:
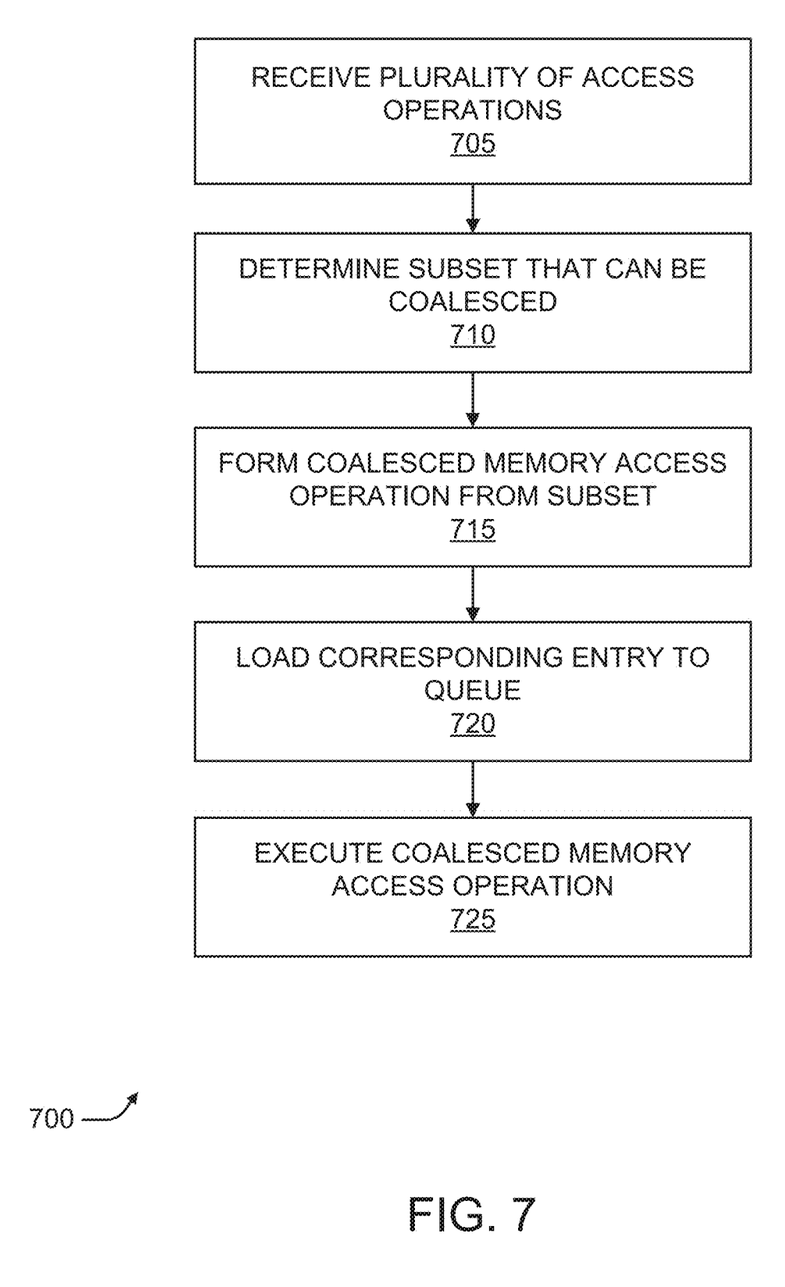
FIG. 7 is a flow diagram illustrating a process of executing gather and scatter instructions in one embodiment.

FIG. 7 is a flow diagram illustrating a process 700 that may be carried out by a back-end pipeline including one or more LSUs to execute gather and scatter instructions in one embodiment. With reference to FIG. 1, the LSU 160A may receive a plurality of access operations corresponding to an gather/scatter instruction (705), and determine a subset of the plurality of access operations that can be coalesced (710). The LSU 160A may then form a coalesced memory access operation from the subset (715). A queue, such as the LRQ 174 (for gather operations) or the SRQ 176 (for scatter operations) may be configured to store multiple memory addresses for a given load-store entry, and the LSU 160A may load an entry corresponding to the coalesced memory access operation to the queue, wherein the entry indicates addresses of each access operation of the subset (720).

The LSU 160A may determine a minimum quantity of cache accesses required for the instruction based on the plurality of access operations, and may reserve a number of operational cycles corresponding to the minimum number of cache accesses. The LSU 160A may then execute the coalesced memory access operation via a memory access lane over the number of operational cycles (725).

The LSU 160A may also communicate with the front-end module 110, wherein the decode unit 130 converts the instruction into the plurality of access operations and transmits the plurality of access operations to the LSU 160A. The decode unit 130 may also transmit to the LSU 160A an indication of a predicted quantity of coalesced memory access operations required by the instruction, and the LSU 160A may determine an actual quantity of coalesced memory accesses required by the instruction and provide an indication of the actual quantity to the prediction unit 120. The prediction unit 120 may also update the table 122 based on the predicted quantity and the actual quantity. The LSU 160A may determine a misprediction based on a comparison of the predicted quantity and the actual quantity of coalesced memory access operations required by the instruction.

The LSU 160A may also analyze a portion of the plurality of access operations to determine the subset of the plurality of access operations that can be coalesced. The LSU 160A may be further configured to assign the coalesced memory access operation to at least one memory access lane, and execute the coalesced memory access operation via the memory access lane (725).

Example embodiments described above may be implemented in graphics processing units (GPUs) in addition to the core microarchitectures described above. One difference between CPU coalescing and coalescing performed in a GPU may be found in the execution models. In GPUs, if any thread in a warp experiences a delay (e.g. due to L1 cache miss), the warp may be context-switched to another warp that may be ready to execute. In other words, the latency can be hidden through context-switching among a large number of threads. Thus, in a GPU execution model, there may be no substantive difference in the way that a GPU executes a gather versus a stride-1 load (although a gather may initiate multiple memory accesses). On the other hand, in the CPU execution model, the onus of latency-hiding is on the processor's ability to extract Instruction Level Parallelism (ILP), which requires processor resources such as the Load Reorder Queue (LRQ) and Reorder Buffer (ROB). In this regard, GPU resources may be expanded as required to process gather operations, whereas stride-1 loads may be handled with fewer resources.

While example embodiments have been particularly shown and described, it will be understood by those skilled in the art that various changes in form and details may be made therein without departing from the scope of the embodiments encompassed by the appended claims.

What is claimed is:

1. A system for processing gather and scatter instructions, comprising:
   a load-store unit configured to 1) receive a plurality of access operations corresponding to an instruction, the instruction being one of a scatter instruction and a gather instruction, 2) determine a subset of the plurality of access operations that can be coalesced, and 3) form a coalesced memory access operation from the subset; and
   a queue configured to store multiple memory addresses for a given load-store entry, the load-store unit configured to load an entry corresponding to the coalesced memory access operation to the queue, the entry indicating addresses of each of the subset.

2. The system of claim 1, wherein the load-store unit is further configured to determine a minimum quantity of cache accesses required for the instruction based on the plurality of access operations.

3. The system of claim 2, wherein the load-store unit is further configured to reserve a number of operational cycles corresponding to the minimum number of cache accesses.

4. The system of claim 3, wherein the load-store unit is further configured to execute the coalesced memory access operation via a memory access lane over the number of operational cycles.

5. The system of claim 1, further comprising a decode unit configured to 1) convert the instruction into the plurality of access operations, and 2) transmit the plurality of access operations to the load-store unit.

6. The system of claim 5, wherein decode unit is further configured to transmit to the load-store unit an indication of a predicted quantity of coalesced memory access operations required by the instruction.

7. The system of claim 6, wherein the load-store unit is further configured to 1) determine an actual quantity of coalesced memory accesses required by the instruction, 2) provide an indication of the actual quantity to a prediction unit.

8. The system of claim 7, wherein the prediction unit is further configured to update a table based on the predicted quantity and the actual quantity.

9. The system of claim 7, wherein the load-store unit is further configured to determine a misprediction based on a comparison of the predicted quantity and the actual quantity of coalesced memory access operations required by the instruction.

10. The system of claim 1, wherein the load-store unit analyzes a portion of the plurality of access operations to determine the subset of the plurality of access operations that can be coalesced.

11. The system of claim 1, wherein the load-store unit is further configured to 1) assign the coalesced memory access operation to at least one memory access lane, and 2) execute the coalesced memory access operation via the memory access lane.

12. A method of processing gather and scatter instructions, comprising:
   receiving a plurality of access operations corresponding to an instruction, the instruction being one of a scatter instruction and a gather instruction;
   determining a subset of the plurality of access operations that can be coalesced;
   forming a coalesced memory access operation from the subset;
   storing multiple memory addresses for a given load-store entry to a queue; and
   loading an entry corresponding to the coalesced memory access operation to the queue, the entry indicating addresses of each of the subset.

13. The method of claim 12, further comprising determining a minimum quantity of cache accesses required for the instruction based on the plurality of access operations.

14. The method of claim 13, further comprising reserving a number of operational cycles corresponding to the minimum number of cache accesses.

15. The method of claim 14, further comprising executing the coalesced memory access operation via a memory access lane over the number of operational cycles.

16. The method of claim 12, further comprising:
   converting the instruction into the plurality of access operations; and
   transmitting the plurality of access operations to a load-store unit.

17. The method of claim 16, further comprising transmitting to the load-store unit an indication of a predicted quantity of coalesced memory access operations required by the instruction.

18. The method of claim 17, further comprising:
determining an actual quantity of coalesced memory accesses required by the instruction; and
providing an indication of the actual quantity to a prediction unit.

19. The method of claim 18, further comprising updating a table based on the predicted quantity and the actual quantity.

20. The method of claim 18, further comprising determining a misprediction based on a comparison of the predicted quantity and the actual quantity of coalesced memory access operations required by the instruction.

21. The method of claim 15, further comprising analyzing a portion of the plurality of access operations to determine the subset of the plurality of access operations that can be coalesced.

22. The method of claim 15, further comprising
assigning the coalesced memory access operation to at least one memory access lane; and
executing the coalesced memory access operation via the memory access lane.

* * * * *

UNITED STATES PATENT AND TRADEMARK OFFICE
CERTIFICATE OF CORRECTION

PATENT NO. : 11,567,771 B2
APPLICATION NO. : 16/944146
DATED : January 31, 2023
INVENTOR(S) : Harold Wade Cain, III et al.

It is certified that error appears in the above-identified patent and that said Letters Patent is hereby corrected as shown below:

On the Title Page

In Item (71), under "Applicant", delete "(SG)" and insert -- (SG); Cray Inc., Seattle, WA (US) --.

In the Specification

In Column 9, Line 26, delete "used used." and insert -- used. --.

In Column 9, Line 30, delete "μpop" and insert -- μop --.

In Column 10, Line 52, delete "to an" and insert -- to a --.

In the Claims

In Column 13, Line 21, in Claim 22, delete "comprising" and insert -- comprising: --.

Signed and Sealed this
Fifteenth Day of August, 2023

Katherine Kelly Vidal
*Director of the United States Patent and Trademark Office*